Aug. 26, 1952 M. C. BRUNT 2,608,040
CONVERTIBLE DISK HARROW
Filed Feb. 26, 1947 2 SHEETS—SHEET 1

Inventor
Marvin C. Brunt

By Clarence A. O'Brien
and Harvey B. Jacobson
Attorneys

Aug. 26, 1952  M. C. BRUNT  2,608,040
CONVERTIBLE DISK HARROW
Filed Feb. 26, 1947  2 SHEETS—SHEET 2

*Inventor*
Marvin C. Brunt

By *Clarence A. O'Brien and Harvey B. Jacobson*
*Attorneys*

Patented Aug. 26, 1952

2,608,040

UNITED STATES PATENT OFFICE 2,608,040

CONVERTIBLE DISK HARROW

Marvin C. Brunt, Benkelman, Nebr.

Application February 26, 1947, Serial No. 730,950

2 Claims. (Cl. 55—81)

This invention relates to improvements in surface tillers.

An object of the invention is to provide an improved form of surface tiller which will comprise two sections which may be used end to end to form a straight tiller, or said sections may be coupled together one behind the other in angular relation and used as a tandem tiller.

Another object of the invention is to provide an improved multiple disk surface tiller with means for cleaning the disks, and an improved adjustable draw bar or tongue construction for said tiller which will be connected to one or more adjustable braces for hauling the surface tiller either when used as a straight tiller, or when used as a tandem tiller.

A further object of the invention is to provide an improved surface tiller comprising one or more identical sections including rigid frames and disk supporting shafts rotatably mounted therein, and resilient connecting means for tying the two sections together to hold them in position and to hold the disks at an even depth in the ground as the tiller is drawn over the ground to be tilled.

Another object of the invention is to provide an improved form of surface tiller which may be drawn in a straight position or in tandem, and which will be provided with an elongatable and adjustable tongue, whereby the proper coupling may be made between the tiller and the tractor used for hauling the same.

A still further object of the invention is to provide an improved surface tiller which will be highly efficient in operation, and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 1:
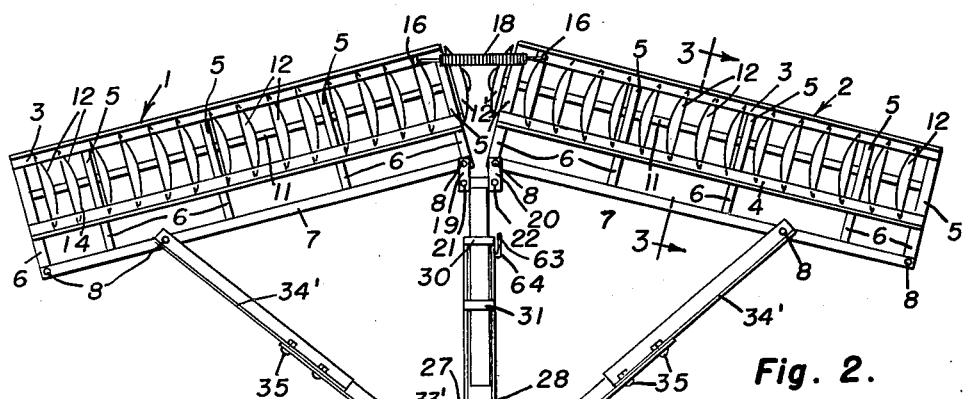
Figure 1 is a plan view of the improved surface tiller shown as used as a straight tiller.

In carrying out the invention, there is provided an improved form of surface tiller comprising identical frame sections generally denoted by the reference numerals 1 and 2.

Each of the frames is formed of longitudinally extending parallel angle irons 3 and 4 which are connected together by means of the longitudinally spaced sections of U-shaped channel iron 5, being welded together as a unit.

A plurality of longer U-shaped channel iron sections 6 are disposed below the sections 5 and are welded together, and extend forwardly and rearwardly of said sections 5.

A U-shaped channel member 7 is welded to the forward ends of the channel sections 6, and support the vertical metal coupling pins 8 at their opposite ends and at one or more points therebetween, for purposes hereinafter more fully described.

Suitable bearings 10 will be attached to the channel sections 6 and will support the longitudinally extending shaft 11 which extends the full length of the frame.

A plurality of tilling disks 12, being arcuate in cross section, are secured in spaced relation upon the shaft 11, with the disks 12 of the frame sections 1 and 2 extending in opposite directions, and with the innermost disks 12' of each frame section being located outside of said frame.

Depending U-shaped cleaner arms 13 are disposed between each tilling disk 12 and have their upper ends threaded as at 14 for extending through openings formed through the parallel extending angle irons 3 and 4, being secured by the nuts 15 threaded upon said threaded upper ends 14. The lower portions of said cleaner arms 13 will extend down below the shaft 11 and will effectively clean trash or rubbish from between the disks 12 as the surface tiller is pulled over the ground to be tilled.

Angle clips 16 will be welded to the ends of the frame sections 1 and 2, and will be apertured as at 17 to receive the hooked ends of the coil spring 18 when the tiller is being used as a straight tiller, to hold the sections in proper alignment, and to act as a spring regulator to hold the disks 12 at an even depth in the ground while tilling the same.

Vertically spaced tongue supporting ears 19 and 20 are secured in any desired manner to the inner adjacent ends of the frame sections 1 and 2, and are apertured to engage the metal pins 8 at their rear ends, and are engaged by the pins 21 and 22 welded to the channel section 23 which is in turn welded to the inner end of the inner inverted U-shaped channel tongue member 24.

A series of spaced stop blocks 25 will be welded to the inner horizontal surface of the member 24 for engagement with a locking member hereinafter described for holding the tongue sections in various degrees of extended position, while a stop block 26 will be positioned at the inner end of the member 24 to be engaged when the tongue sections are completely telescoped to hold the same in such positions.

An L-shaped locking member 60 is rotatably mounted between the bearings 61 secured to the lower surfaces of the two angle iron members 27 and 28, and is bent upwardly at right angles as at 62, terminating in an eye 63 whereby the same may be rocked or rotated. A locking finger or detent 64 will be formed integrally with the locking member 60 and will be adapted to extend upwardly between the slot formed between the adjacent edges of said angle iron members 27 and 28, whereby the end of said locking finger 64 will be engaged by any desired one of the stop blocks 25 or the stop block 26, when said tongue sections are in completely telescoped position.

The outer tongue section is formed by the spaced longitudinally extending angle irons 27 and 28, which are tied together across their upper edges at their outer and inner ends by means of the cross connecting plates 29 and 30, respectively, and also by the central connecting strip or plate 31, all of which are suitably welded in their proper positions.

A U-shaped clevis hook 32 will be welded to the forward end of the channel iron members 27 and 28 for coupling to a tractor (not shown) for pulling the tiller, and the vertically spaced transversely extending plates 50 will support the spaced vertically extending pins 51.

A pair of extendable braces are provided for connection between the pins 51 at the forward end of the outer tongue section and the pins 8 supported by the forward U-shaped channel member 7. Alignable openings 33 and 34 are formed through the front and back brace sections 33' and 34', and are adapted to be secured together in the desired adjusted position by means of the bolts 35.

A box construction will be formed at the front end of the front brace section 33' by welding a short section of angle iron 36 to the end of the section 34, and will be formed with the oppositely disposed apertures 37 and 38 for engaging the pins 51 supported by the plates 50.

An offset tongue 39 will be welded to the rear end of the brace section 34' and will be formed with the opening 40 which will underlie the opening 41 in said section 34', whereby the same may be attached to the pins 8 on the channel members 7.

Figure 2:
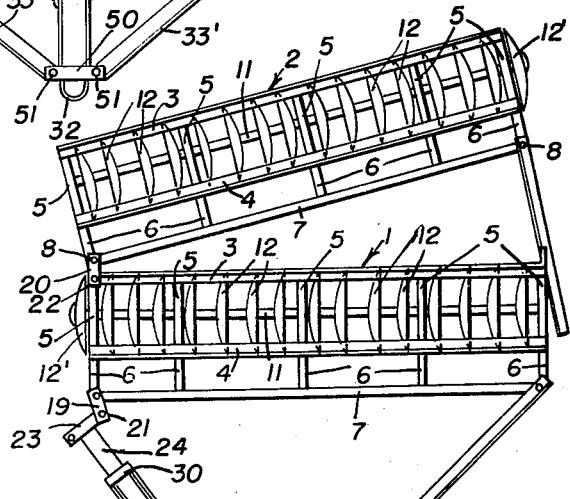
Figure 2 is a plan view of the improved surface tiller shown as used as a tandem tiller.
Figure 4:
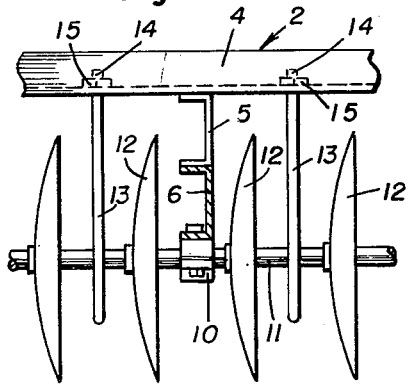
Figure 4 is a partial sectional view taken on the line 4—4 of Figure 3.
Figure 3:
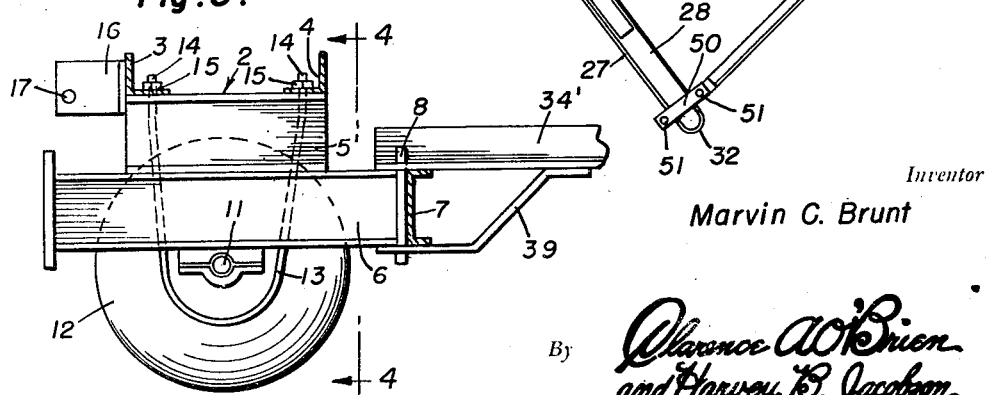
Figure 3 is a partial sectional view taken on the line 3—3 of Figure 1.
Figure 5:
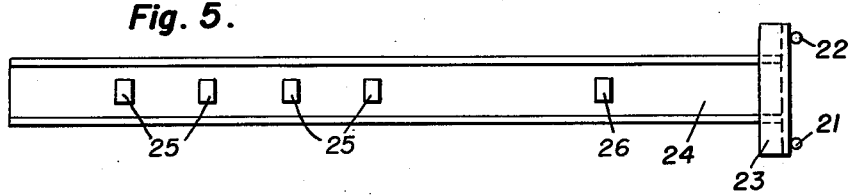
Figure 5 is a bottom plan view of the inner tongue member for the surface tiller.
Figure 6:
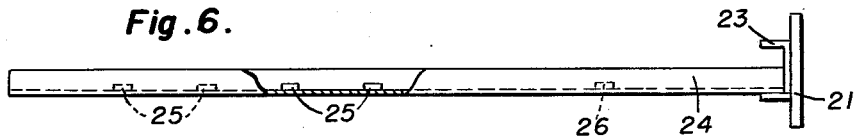
Figure 6 is a side elevation of the inner tongue member, being partly broken away and in section to show the stop lugs welded thereto.
Figure 7:
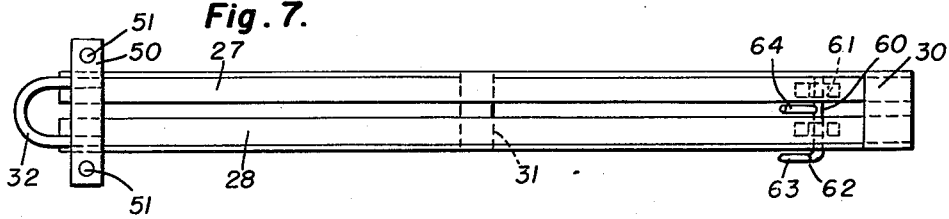
Figure 7 is a top plan view of the outer tongue member.
Figure 8:
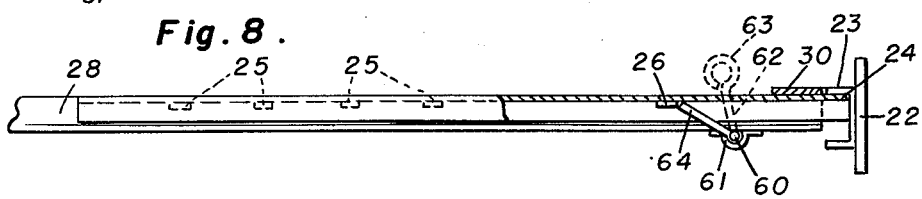
Figure 8 is a side elevation of the assembled tongue, being partly broken away and in section to show the locking means for holding the tongue sections in the desired adjusted position.
Figure 9:
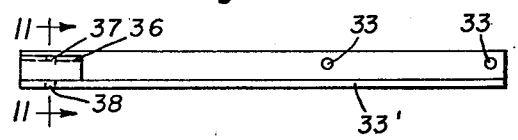
Figure 9 is a side elevation of the front section of the tongue brace.
Figure 10:
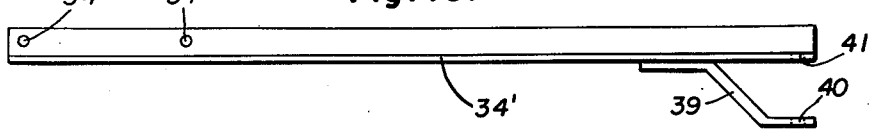
Figure 10 is a side elevation of the rear section of the tongue brace.
Figure 11:
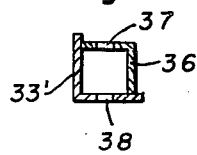
Figure 11 is a sectional view taken on the line 11—11 of Figure 9.

In actual operation, the tiller sections 1 and 2 may be connected together as shown in Figure 1 of the drawings for providing a straight tiller. However, when it is desired to provide a tandem tiller, the sections will be arranged in the manner as clearly illustrated in Figure 2 of the drawings, the tongue and one brace being used to haul the tiller, and the other brace being connected between the outer ends of the tiller sections to provide an angular relation between said sections, which will provide for the thorough tilling of the soil with the disks being disposed in opposite directions for running in the same tracks and for evening off the ground by the rear disks covering up the furrows made by the front disks.

From the foregoing description, it will be apparent that there has been devised and provided a highly efficient form of surface tiller comprising a pair of interconnected frames having a plurality of rotary disk tilling blades supported on each frame, and so arranged that the tiller may be operated efficiently close to a fence or hedge row and in all portions of a field.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In a convertible agricultural implement, an elongated draft tongue, a first elongated tool carrying frame having one end secured to the rear end of the tongue and extending laterally therefrom, a diagonal brace connecting the tongue and the first frame, a second elongated tool carrying frame normally disposed in end to end relation to the first frame and on the opposite side of the tongue, said second frame being alternatively positionable in trailing tandem relation with respect to the first frame, a link carried by the second frame normally secured to the rear end of the tongue and alternatively secured to the first frame when the frames are in tandem relation, and a brace carried by the second frame normally secured to the front end of the tongue and alternatively secured to the first frame when the frames are in tandem relation.

2. In a convertible agricultural implement, an elongated adjustable draft tongue, a first elongated tool carrying frame having one end secured to the rear end of the tongue and extending laterally therefrom, a diagonal brace connecting the tongue and the first frame, a second elongated tool carrying frame normally disposed in end to end relation to the first frame and on the opposite side of the tongue, said second frame being alternatively positionable in trailing tandem relation with respect to the first frame, a link pivoted to the second frame normally pivoted to the rear end of the tongue and alternatively pivoted to the first frame when the frames are in tandem relation, and a brace carried by the second frame normally secured to the front end of the tongue and alternatively secured to the first frame when the frames are in tandem relation.

MARVIN C. BRUNT.

REFERENCES CITED

The following references are of record in the file of this patent:

UNITED STATES PATENTS

| Number | Name | Date |
| --- | --- | --- |
| Re. 22,327 | Seaholm | May 25, 1943 |
| 1,604,668 | Urtfjeld et al. | Oct. 26, 1926 |
| 1,793,746 | Olson | Feb. 24, 1931 |
| 1,830,993 | Furrer | Nov. 10, 1931 |
| 2,002,272 | Mowry | May 21, 1935 |
| 2,062,756 | McKahin | Dec. 1, 1936 |
| 2,113,832 | Everett | Apr. 12, 1938 |
| 2,251,500 | Short | Aug. 5, 1941 |
| 2,255,380 | Curtis | Sept. 9, 1941 |
| 2,338,698 | White | Jan. 11, 1944 |
| 2,548,539 | Knapp | Apr. 10, 1951 |